(12) United States Patent
Hansen et al.

(10) Patent No.: US 12,313,039 B2
(45) Date of Patent: May 27, 2025

(54) WIND TURBINE BLADE HAVING A DE-ICING SYSTEM

(71) Applicant: LM WIND POWER A/S, Kolding (DK)

(72) Inventors: Lars Bo Hansen, Kolding (DK); Casper Kildegaard, Kolding (DK); Mark Hancock, Eastleigh (GB)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/289,434

(22) PCT Filed: Jun. 16, 2022

(86) PCT No.: PCT/EP2022/066486
§ 371 (c)(1),
(2) Date: Nov. 3, 2023

(87) PCT Pub. No.: WO2022/263596
PCT Pub. Date: Dec. 22, 2022

(65) Prior Publication Data
US 2024/0254972 A1   Aug. 1, 2024

(30) Foreign Application Priority Data

Jun. 16, 2021 (DK) .............................. PA202170304

(51) Int. Cl.
*F03D 80/40* (2016.01)

(52) U.S. Cl.
CPC .................................. *F03D 80/401* (2023.08)

(58) Field of Classification Search
CPC ......... B64D 15/12; B64D 15/14; F01D 25/02; F03D 80/40; F03D 80/401
See application file for complete search history.

(56) References Cited

U.S. PATENT DOCUMENTS

| 4,737,618 A | 4/1988 | Barbier et al. |
| 6,338,455 B1 * | 1/2002 | Rauch ...................... H05B 3/16 244/134 R |

(Continued)

FOREIGN PATENT DOCUMENTS

| GB | 2319942 A | 6/1998 |
| WO | 2011096851 A1 | 8/2011 |

*Primary Examiner* — Christopher R Legendre
(74) *Attorney, Agent, or Firm* — Nath, Goldberg & Meyer; Jerald L. Meyer; Tanya E. Harkins (57) ABSTRACT

A wind turbine blade includes: an aerodynamic shell body with a suction side shell part and a pressure side shell part that extends in a longitudinal direction between a root and a tip and in a transverse direction between a leading edge and a trailing edge, and a de-icing system. The de-icing system includes: a number of heating layers each having electrically conductive fibres extending substantially in the longitudinal direction of the wind turbine blade along a longitudinal section of the aerodynamic shell body to provide resistive heating to the longitudinal section of the aerodynamic shell body; a number of metallic patches including a first metallic patch, the number of metallic patches being arranged to contact at least the number of heating layers; and a conductor cable that is electrically connected to the number of metallic patches and further is configured for electrically connecting to a power source.

20 Claims, 7 Drawing Sheets

(56) References Cited

U.S. PATENT DOCUMENTS

| | | | | |
|---|---|---|---|---|
| 7,291,815 B2* | 11/2007 | Hubert | ............... | B64D 15/12 |
| | | | | 219/535 |
| 2013/0028738 A1* | 1/2013 | Nordin | ............... | F03D 80/30 |
| | | | | 416/39 |
| 2024/0254972 A1* | 8/2024 | Hansen | ............... | F03D 80/40 |

* cited by examiner

WIND TURBINE BLADE HAVING A DE-ICING SYSTEM

This is a National Phase Application filed under 35 U.S.C. 371 as a national stage of PCT/EP2022/066486, filed Jun. 16, 2022, an application claiming the benefit of Denmark Application No. PA202170304, filed Jun. 16, 2021, the content of each of which is hereby incorporated by reference in its entirety.

FIELD OF THE INVENTION

The present invention relates to a wind turbine blade having a de-icing system.

BACKGROUND OF THE INVENTION

When wind turbines are operated in cold-weather climates, the potential build-up of ice on the wind turbine blades presents challenges for turbine performance. In a first aspect, any ice formation on the blade surfaces will disrupt the blade aerodynamics, which may lead to a reduction in turbine efficiency and/or increased operational noise levels. In a further aspect, ice which breaks away from blade surfaces can present a falling hazard. In this regard, wind turbine blades in such locations are often provided with systems to deliver ice prevention and/or removal.

It is known to provide hot-air de-icing systems which operate on the principle of supplying heated air to the interior of a wind turbine blade, to raise the surface temperature of the blade to above freezing. An example of such a hot-air de-icing system can be seen in US Patent Application Publication No. US 2013/0106108.

It is also known to utilise electrical heating systems embedded in blades and mechanical de-icing systems. For electrical or resistive heating systems, there is a need for two electrical connections from a power source to the heating material, such as a heating mat, typically a root connection and a tip connection, e.g. one ground and one power connection. The connections may be provided by a metal element in direct electrical connection with the heating mats. However, the metal element may be a source for fatigue in the heating mats, in particular if the heating mat comprises conductive fibres for providing the heating due to anisotropy. The problem may be particularly pronounced at the tip connection due to the large forces experienced during operation of the wind turbine blade. Accordingly, there is a need for new solutions.

SUMMARY OF THE INVENTION

It is an object of the invention to provide a wind turbine blade having a de-icing system which overcomes or ameliorates at least one of the disadvantages of the prior art or which provides a useful alternative.

A first aspect of this disclosure relates to a wind turbine blade comprising:
  an aerodynamic shell body with a suction side shell part and a pressure side shell part that extends in a longitudinal direction between a root and a tip and in a transverse direction between a leading edge and a trailing edge, and
  a de-icing system comprising:
    a number of heating layers including a first heating layer, the number of heating layers each comprising electrically conductive fibres configured and arranged to extend substantially in the longitudinally direction of the wind turbine blade along a longitudinal section of the aerodynamic shell body to provide resistive heating to the longitudinal section of the aerodynamic shell body;
    a number of metallic patches including a first metallic patch, the number of metallic patches being arranged to contact at least the number of heating layers; and
    a conductor cable that is electrically connected to the number of metallic patches and further is configured for electrically connecting to a power source;
  wherein the electrically conductive fibres of the number of heating layers are configured for, upon receiving electrical power from the conductor cable via the number of metallic patches, supplying resistive heating to an outer side of the wind turbine blade so as to de-ice the wind turbine blade.

The electrically conductive fibres function by resistive heaters to provide heat for de-icing and are therefore, in this regard, relatively poor electrical conductors. Thus, a good electrical contact (i.e. with a low electrical resistance) from the conductor cable to each fibre is needed. The present disclosure uses a number of metallic patches to provide the electrical connection from the conductor cable to the number of heating layers. Since the number of metallic patches are made of a metal, they have a relatively good electrical conductivity. Further, the number of metallic patches have an increased contact area compared to the conductor cable. Therefore, the number of metallic patches may thus provide a good electrical contact and good electrical power transfer between the conductor cable and each electrically conductive fibre of the number of heating layers.

The de-icing system may additionally or alternatively be known as an anti-icing system. In practice both systems can remove already present ice from the wind turbine blade by supplying heat but also prevent ice building up on the wind turbine blade by preemptively supplying heat.

Additionally, or alternatively, at least the number of heating layers and the number of metallic patches may be formed as a laminate structure that is attached to an inner side of the aerodynamic shell body. Thus, the de-icing system may be retrofitted in an existing wind turbine blade.

Alternatively, at least the number of heating layers and the number of metallic patches may be integrated into the aerodynamic shell body.

Additionally or alternatively, the electrical contact between the number of heating layers and the number of metallic patches may be formed by a pressure experienced during an infusion process, e.g. when integrating the number of heating layers and the number of metallic patches in the aerodynamic shell body or when forming the laminate structure for attachment to an inner side of the aerodynamic shell body.

Additionally or alternatively, the conductor cable may be connected to the number of metallic patches via a number of electrical connection interfaces.

Additionally or alternatively, the number of heating layers may comprise electrically conductive carbon fibres, preferably a biaxial carbon fibre layer.

Additionally or alternatively, the number of heating layers may comprise a unidirectional carbon fibre layer.

Additionally or alternatively, the number of metallic patches may be metallic meshes, preferably a copper mesh, e.g. an expanded copper mesh or perforated copper mesh.

Additionally or alternatively, the number of metallic patches may have a longitudinal extent of 0.30 to 2.0 m, preferably 0.50 to 1.5 m.

Additionally or alternatively, the number of metallic patches may comprise a plurality of metallic patches that are distributed with a mutual longitudinal spacing along the number of heating layers. By having a plurality of metallic patches, the metallic patches can be made smaller while preserving a good electrical contact. This may advantageously reduce stress concentrations experienced by the metallic patches, and the de-icing system may become more robust accordingly.

Additionally or alternatively, the plurality of metallic patches may be arranged with a mutual spacing of at least 2.0 metres.

Additionally or alternatively, the number of metallic patches may comprise one or more sets of two to six patches, preferably three patches, that may have a longitudinal extent of 100 mm to 200 mm and may have a width of 20 mm to 50 mm. Each patch of the set of patches may be mutual spaced by 15 mm to 50 mm, preferably 20 mm to 30 mm.

Additionally or alternatively, the number of heating layers may include a second heating layer, wherein the number of metallic patches is sandwiched between the first heating layer and second heating layer.

Additionally or alternatively, the number of heating layers may be arranged along a leading edge section of the wind turbine blade. Additionally, the number of first heating layers may each have a first side part extending along a part of the suction side shell part and a second side part extending along the pressure side shell part.

Additionally, the wind turbine blade may comprise an internal beam structure arranged at least between a part of the first side part and the second side part of the at least first heating layer.

Additionally or alternatively, the conductor cable may comprise a plurality of electrically conductive strands having first ends being spaced apart and distributed on the number of metallic patches to form the electrical connection between the conductor cable and the number of metallic patches. The electrical connection may be formed by soldering and/or a conductive adhesive. By connecting the strands of the conductor cable directly to the metallic patches, any connecting element, such as disk or bolted connections, can be omitted, potentially reducing or even eliminating some causes of failures and misfunctions. Advantageously, the first ends of the strands may be embedded in the laminate structure of the aerodynamic shell body. This may provide electrical insulation and mechanical stability for the electrical connection.

Additionally, the plurality of electrically conductive strands may be spread in a fan arrangement.

Additionally or alternatively, the conductor cable may be connected to the number of metallic patches via a number of electrical connection interfaces and the number of electrical connection interfaces are formed by an electrical attachment of a plurality of electrically conductive strands of the conductor cable onto the number of metallic patches. Further, the plurality of electrically conductive strands forming each of the number of electrical connection interfaces are spread in a fan arrangement.

Additionally or alternatively, at least the first metallic patch, or preferably each of the number of metallic patches, may have an embedded portion and an exposed portion. The embedded portion may be fully embedded within the aerodynamic shell body, and the exposed portion may extend from the aerodynamic shell body. The exposed portion may comprise a free end of the metallic patch configured for being connected to the conductor cable. The exposed portion of the metallic patches may have the advantage of not being subjected to the same strains as the aerodynamic shell body and thus be more robust. A further advantage may be that the conductor cable can be directly connected to the number of metallic patches reducing the number of connection interfaces.

Additionally, at least the first metallic patch, or preferably each of the number of metallic patches, may comprise a border line between the embedded portion and the exposed portion, the border line being oriented substantially parallel to the longitudinal direction of the aerodynamic shell body and the wind turbine blade. By orienting the border line(s) in parallel to the longitudinal axis, which is also typically the main strain direction, the structural properties of the wind turbine blade may be less affected and stress concentrations may be reduced.

Such an arrangement that includes a metallic patch with an exposed portion may be manufactured by a method comprising:
- laying up a stack comprising a number of body layers, a number of heating layers and a number of metallic layers in a mould,
- arranging a portion of the number of metallic patches to extend through at least one of the heating layers and away from an inner side of the stack so that the portion of the number of metallic patches is an exposed portion,
- arranging said exposed portion onto the inner side of the stack and bagging the lay-up stack in a vacuum bag,
- evacuating the vacuum bag,
- infusing and curing the stack, and
- removing the vacuum bag from the cured stack.

Additionally or alternatively, the number of metallic patches may extend through a slit of the number of heating layers, e.g. a slit of the first heating layer.

Alternatively, ends of the number of metallic patches may be wrapped around an end of the number of heating layers.

Additionally or alternatively, the conductor cable may comprise a connection element extending through a portion of the aerodynamic shell body to form an electrical connection interface to the number of metallic patches.

Additionally or alternatively, the de-icing system may comprise a number of buttresses between the exposed portion of the number of metallic patches and an inner side of the aerodynamic shell body. The number of buttresses may be made of a resin, such as the same resin as the infusion of the aerodynamic shell body. Such buttresses may provide increased mechanical robustness as well as electrical insulation to the number of metallic patches.

Additionally or alternatively, the conductor cable may be connected to the number of metallic patches via a flat electrical conductor, such as a braided conductor or cable section, e.g. a copper braided conductor. By having a flat conductor connected to the number of metallic patches a good electrical contact may be ensured since the electrical connection may cover a larger area compared to a traditional circular conductor.

Additionally, the conductor cable itself may be a flat conductor cable, such as a braided conductor or cable section, e.g. a copper braided conductor. The flat electrical conductor may be connected via tin spot soldering, spot welding or roller welding. The flat electrical conductor may be arranged along the longitudinal direction of the aerodynamic shell body or along a chordwise direction of the aerodynamic shell body. Such an electrical connection may allow injection with resin while retaining a good electrical contact. Further advantages of such an electrical connection may include increased flexibility and reduced weight and therefore more robust against mechanical fatigue. The solution is also relatively cheap and easy to manufacture.

A flat conductor cable may be understood as a conductor cable having a first and a second perpendicular cross-sectional dimension wherein the first cross-sectional dimension is at least twice as large as the second cross-sectional dimension.

Additionally or alternatively, the electrical connection between the conductor cable and the number of metallic patches may be a tip connection arranged at a tip end of the de-icing system.

Additionally or alternatively, the wind turbine blade may comprise a first metallic connection element, such as a metallic disc, embedded between the number of heating layers and the number of metallic patches and arranged in electrical contact with the number of metallic patches, wherein the conductor cable is attached to, and electrically connected with, the first metallic connection element so as to form an electrical connection, preferably the tip connection, between the conductor cable and the number of metallic patches. The first metallic connection element may be made of bronze. The first metallic connection element may be a flat element. A flat element may be understood as having a thickness that is at least half of the length and at least half of the width of the element. The first metallic connection element may be arranged so that the thickness of the element extends along a thickness direction of the shell body.

Additionally, the first metallic connection element may be fully embedded between the number of heating layers and the number of metallic patches. The wind turbine blade may comprise a second metallic connection element, such as a rod or bolt, extending through the first metallic connection element and to the conductor cable, preferably to a termination block of the conductor cable, so as to form the electrical connection between the conductor cable and the first metallic connection element.

Additionally, the second metallic connection element may be arranged in a hole, e.g. formed by drilling through the shell body. The hole may extend through the first metallic connection element and preferably through the heating layer and metallic patch sandwiching the first metallic connection element. The hole may be a through hole extending through the shell body from the exterior of the shell body to the conductor cable, preferably to the termination block of the conductor cable.

Additionally or alternatively, the flat electrical conductor may be arranged on and in electrical contact with the number of metallic patches. The first metallic connection element may be arranged on and in electrical contact with the flat electrical conductor.

A second aspect of the present disclosure relates to a method of forming an electrical connection in the de-icing system of a wind turbine blade according to the first aspect of the present disclosure, comprising the steps of drilling a first hole in the shell body from the exterior of the shell body through at least the first metallic connection element, inserting a second metallic connection element through the first hole to the conductor cable, preferably the termination block of the conductor cable, so as to form the electrical connection between the conductor cable and the number of metallic patches via the first metallic connection element.

Additionally or alternatively, the de-icing system may further comprise a power supply, wherein the conductor cable is electrically connected to the power source.

A third aspect of the present disclosure relates to a de-icing system for a wind turbine blade comprising an aerodynamic shell body with a suction side shell part and a pressure side shell part that extends in a longitudinal direction between a root and a tip and in a transverse direction between a leading edge and a trailing edge, the de-icing system comprising:
  a number of heating layers including a first heating layer, the number of heating layers comprising electrically conductive fibres configured to extend substantially in the longitudinally direction of the wind turbine blade along a longitudinal section of the aerodynamic shell body to provide resistive heating to the longitudinal section of the aerodynamic shell body;
  a number of metallic patches including a first metallic patch, the number of metallic patches being arranged to contact at least the first heating layer; and
  a conductor cable that is electrically connected to the number of metallic patches and further is configured for electrically connecting to a power source;
  wherein the electrically conductive fibres of the number of heating layers are configured for, upon receiving electrical power from the conductor cable via the number of metallic patches, supplying heat to an outer side of the wind turbine blade so as to de-ice the wind turbine blade.

Additionally or alternatively, the number of metallic patches and the number of heating layers may be joined by a resin comprising conductive particles, such as silver particles or dust. Such a de-icing system may be advantageous since the electrical connection can be tested and validated prior to being included on or in the aerodynamic shell body such that any defects can be detected and possibly corrected before inclusion into a blade.

A third aspect of this disclosure relates to a wind turbine comprising a number of, preferably two or three, wind turbine blades according to the first aspect of this disclosure.

Additionally, the wind turbine may comprise a power supply, e.g. arranged in a hub or machine housing of the wind turbine, wherein the conductor cable is electrically connected to the power source.

A person skilled in the art will appreciate that any one or more of the above aspects of this disclosure and embodiments thereof may be combined with any one or more of the other aspects of this disclosure and embodiments thereof.

BRIEF DESCRIPTION OF THE FIGURES

The invention is explained in detail below with reference to embodiments shown in the drawings, in which.

DETAILED DESCRIPTION OF THE INVENTION

In the following, a number of exemplary embodiments are described in order to understand the invention.

Figure 1:
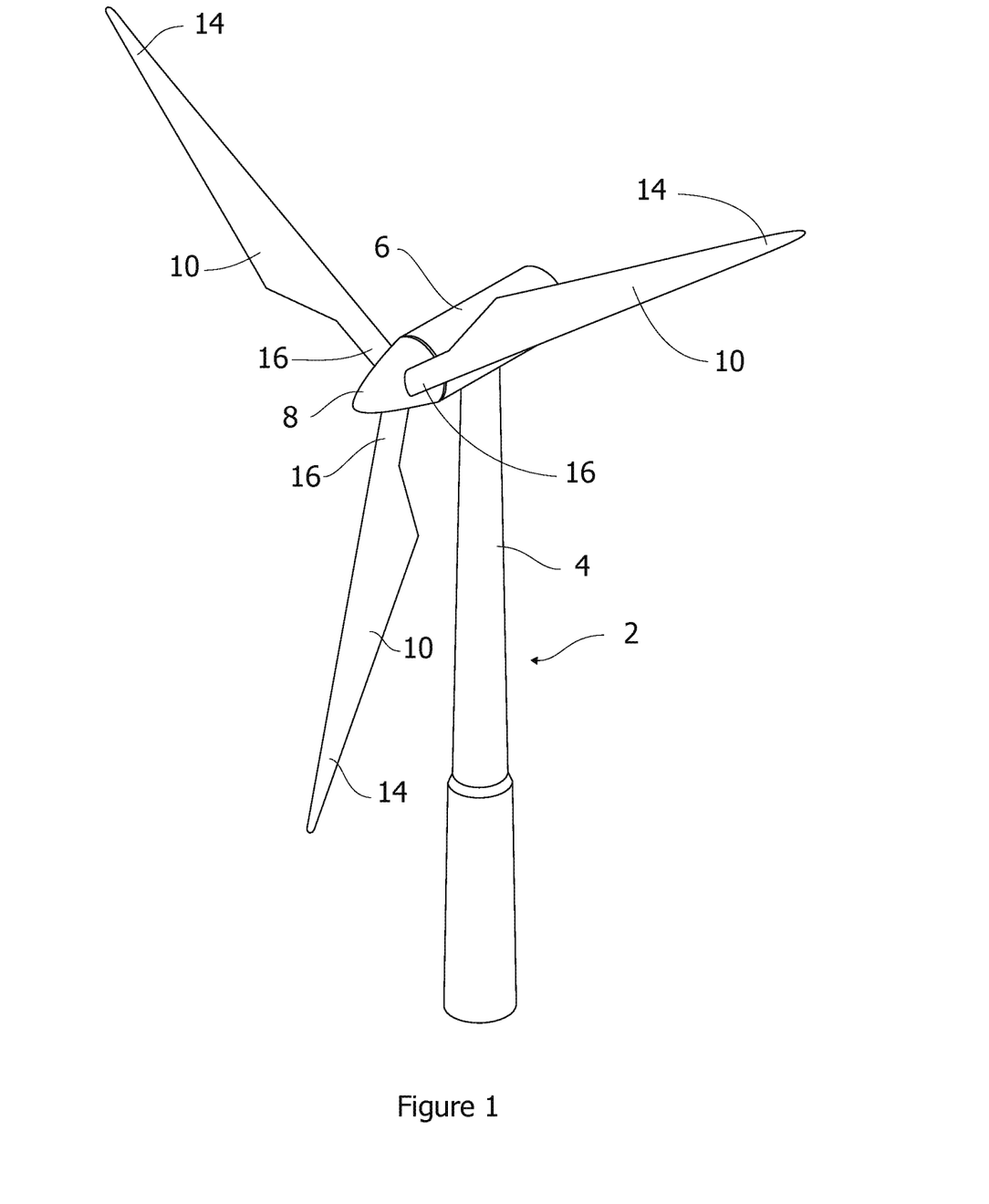
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

Figure 2:
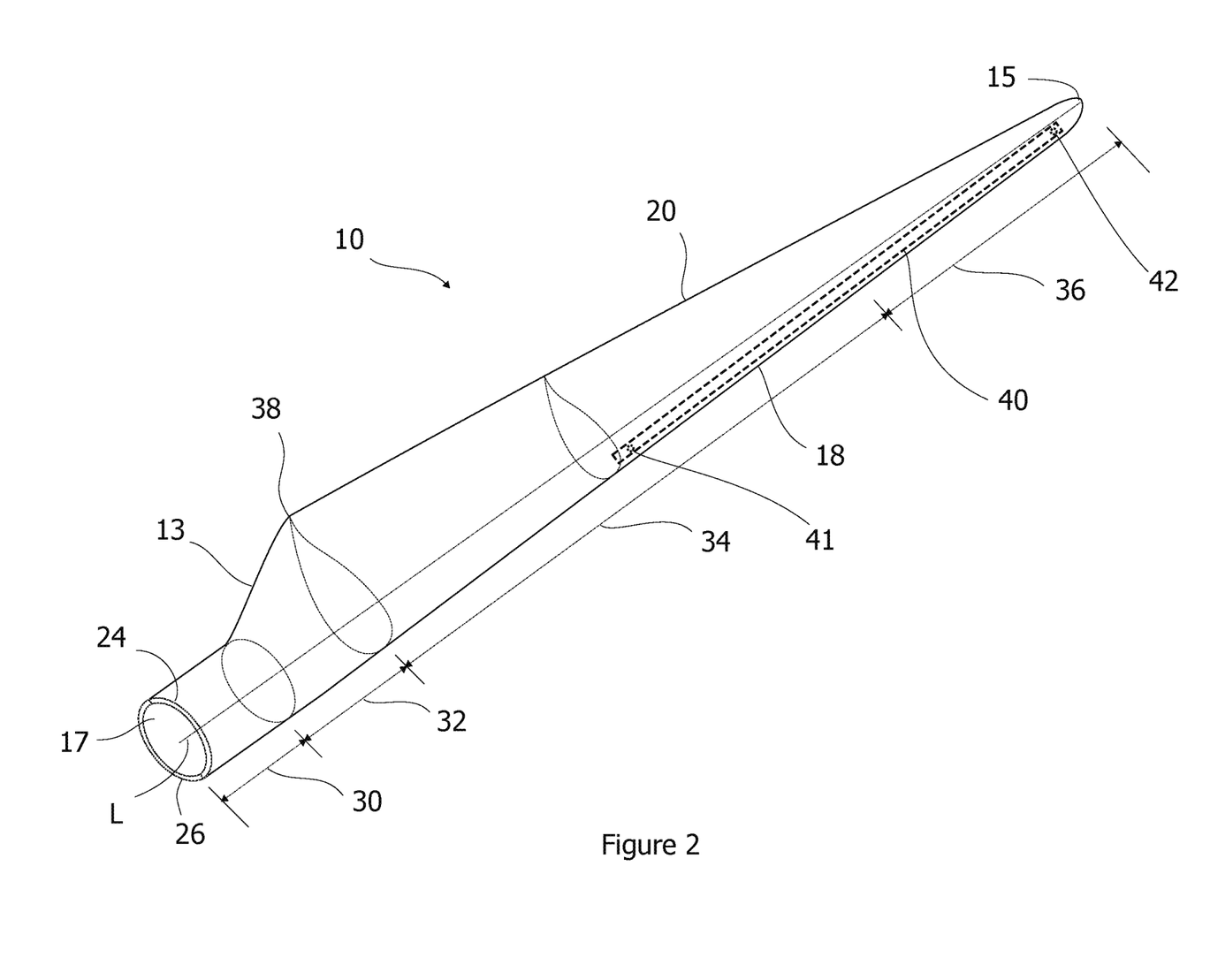
FIG. 2 shows a schematic view of a wind turbine blade.

FIG. 2 shows a schematic view of an exemplary wind turbine blade 10. The wind turbine blade 10 has the shape of a conventional wind turbine blade 10 extending along a longitudinal axis L between a root end 17 and a tip end 15 and comprises an aerodynamic exterior blade surface including a root region 30 closest to the hub, a profiled or an airfoil region 34 furthest away from the hub and a transition region 32 between the root region 30 and the airfoil region 34. The airfoil region 34 includes a tip region 36 with the tip end 15. The blade 10 comprises a leading edge 18 facing the direction of rotation of the blade 10, when the blade is mounted on the hub 8, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing radial distance from the hub. The airfoil region 34 has an airfoil profile with a chord extending between the leading edge 18 and the trailing edge 20 of the blade 10. The width of the chord decreases with increasing radial distance from the hub.

A shoulder 38 of the blade 10 is defined as the position where the blade 10 has its largest chord length. The shoulder 38 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub. The blade is typically made from a pressure side shell part 24 and a suction side shell part 26 that are glued to each other along bond lines at the leading edge 18 and the trailing edge 20 of the blade to from an aerodynamic shell body 21 of the wind turbine blade 10.

Figure 3:
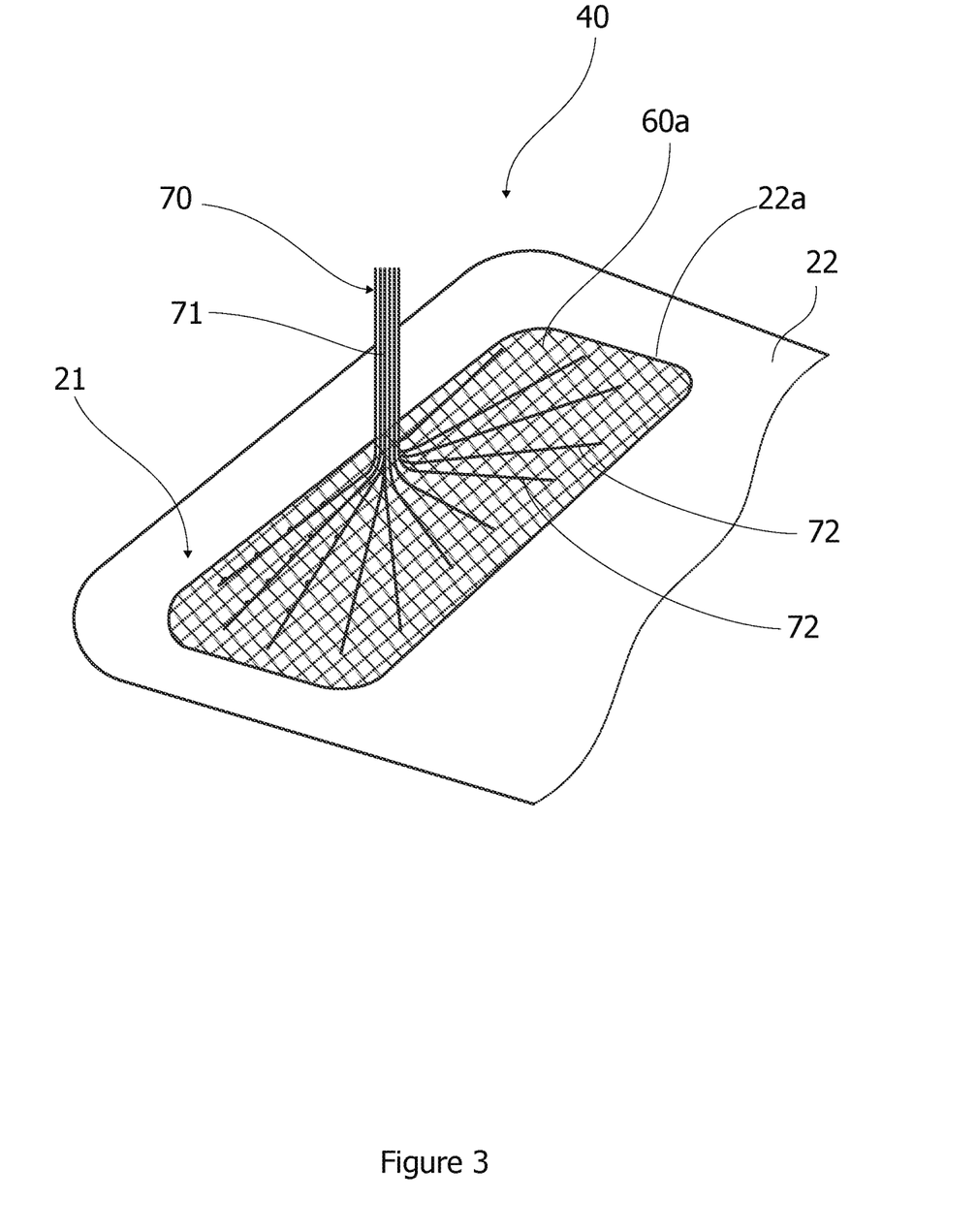
FIG. 3 shows a schematic perspective view of a first connection between a conductor cable and a metallic patch in a de-icing system.

Turning to FIG. 3 illustrating part of a de-icing system 40 incorporated in such an aerodynamic shell body 21 of the blade 10. The de-icing system 40 comprises a number of heating layers (not shown) including a first heating layer. The number of heating layers each comprises electrically conductive fibres that are configured and arranged to extend substantially in the longitudinally direction L of the wind turbine blade 10 along a longitudinal section of the aerodynamic shell body 21 to provide resistive heating to the longitudinal section of the aerodynamic shell body 21. The de-icing system 40 further comprises a number of metallic patches including a first metallic patch 60a that are arranged to contact the number of heating layers and made of a copper mesh. Additionally, the de-icing system 40 comprises a conductor cable 70 that is electrically connected to the number of metallic patches including the first metallic patch 60a and is further electrically connected to a power source. The power source may be included as a part of the de-icing system 40, and may be arranged in the blade 10 or in the wind turbine 2, e.g. in the nacelle 6. The electrically conductive fibres of the number of heating layers are configured for, upon receiving electrical power from the conductor cable 70 via the number of metallic patches 60, supplying resistive heating to an outer side of the wind turbine blade 10 so as to de-ice the wind turbine blade. In the shown embodiment, the number of metallic patches and the number of heating layers form part of a laminate structure of the aerodynamic blade body 21. A portion of the first metallic patch 60a is exposed by an opening 22a in an inner body layer 22, e.g. a glass fibre-reinforced cover layer, of the aerodynamic blade body 21. As shown in FIG. 3, the conductor cable 70 comprises a plurality of conductive strands 71 that each has a first end 72. The first ends 72 of the conductive strands 71 are spaced apart and distributed in a fan arrangement on the first metallic patch 60a to form a number of electrical connection interfaces, e.g. soldered or adhered with a conductive adhesive, between the conductor cable 70 and the first metallic patch 60a within the opening 22a. Alternatively, the number of electrical connection interfaces between the first ends 72 of the conductive strands 71 and the first metallic patch 60a is embedded within the laminate structure of the aerodynamic shell body 21 in order to provide electrical insulation and mechanical stability to the electrical connection interfaces.

Figure 4:
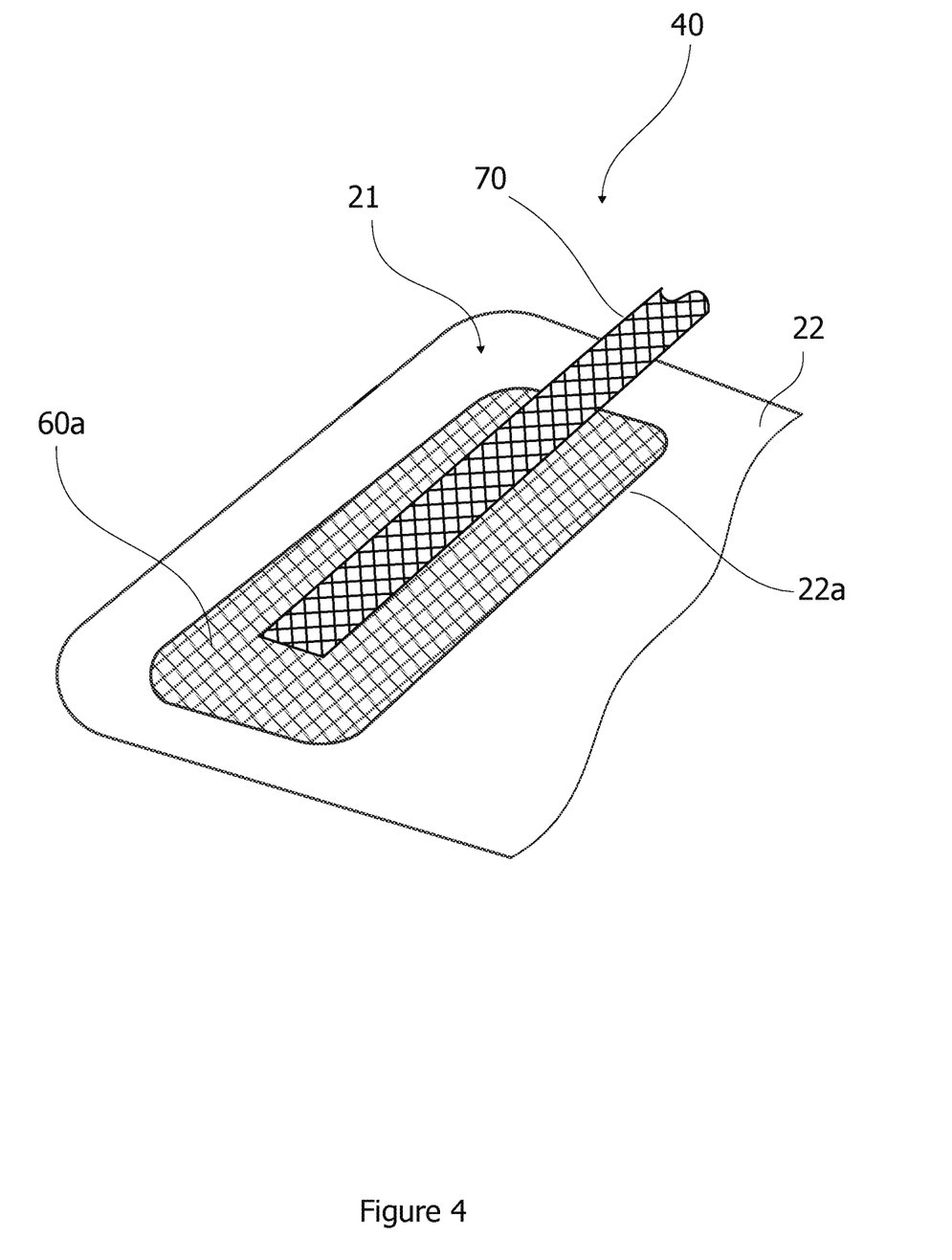
FIG. 4 shows a schematic perspective view of a second connection between a conductor cable and a metallic patch in a de-icing system.

FIG. 4 illustrates a similar connection between the conductor cable 70 and the first metallic patch 60a as FIG. 3. However, in FIG. 4, the conductor cable 70 is a relatively wide and thin conductor cable comprising braided copper strands (the hatching of the conductor cable in FIG. 4 represents braided strands). An exposed end section of braided copper strands of the conductor cable 70 is electrically connected to the first metallic patch 60a, e.g. via soldering or a conductive adhesive.

Figures 5A, 5B:
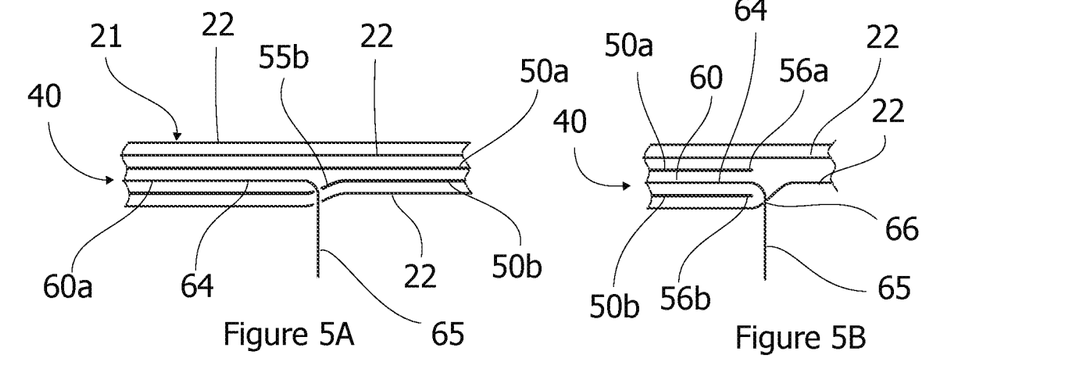
FIG. 5A shows a schematic cross-sectional view of a first layer arrangement of a de-icing system.
FIG. 5B shows a schematic cross-sectional view of a second layer arrangement of a de-icing system.

Turning to FIG. 5A, another embodiment of a de-icing system 40 is shown. In this embodiment, an embedded portion 64 of the first metallic patch 60a is sandwiched between a first heating layer 50a and a second heating layer 50b. The first metallic patch 60a extends through a slit 55b of the second heating layer 50b and a slit of an inner body layer 22 and an exposed portion 65 of the first metallic patch 60a extends from the inner body layer 22. A conductor cable 70 is then electrically connected to this exposed portion 65 of the first metallic patch 60a.

FIG. 5B illustrates a similar variant to that of FIG. 5A in which the second heating layer 50b terminates at an end 56b and the first metallic patch 60a extends and wraps around the end 56b of the second heating layer 50b and through a slit of the body layer 21. Accordingly, the exposed portion 65 also in this case extends from the slit of the body layer 21 but, in this case, a slit of the heating layer is not necessary.

The first heating layer 50a may terminate at an end 56a adjacent to the end 56b of the second heating layer 50b as shown.

Figure 5C:
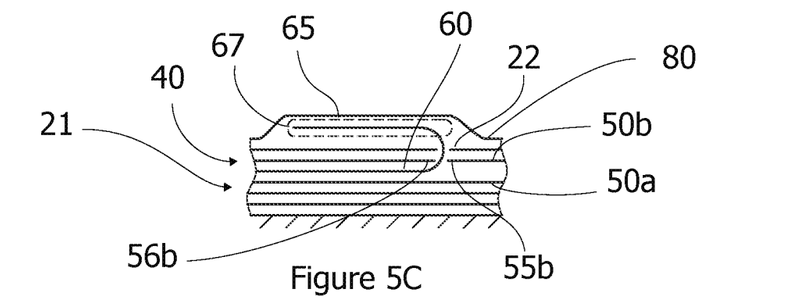
FIG. 5C shows a schematic cross-sectional view of a manufacturing lay-up of the first layer arrangement of a de-icing system.

FIG. 5C illustrates a manufacturing lay-up prior to infusion and curing for obtaining the arrangement shown in FIGS. 5A and 5B. Accordingly, the arrangement of FIG. 5A is obtained by laying the layers up so that the metallic patch 60 extends through a slit 55b of the second heating layer 50b and a slit of the body layer 22. The arrangement of FIG. 5B is obtained instead by omitting part of the second heating layer 50b so that instead of the metallic patch 60 extending through the slit of the second heating layer 50b, the metallic patch instead extends and wraps around an end 56b of the second heating layer 50b. In both cases, the exposed portion 65 of the metallic patch 60 extends from the slit of the body layer 22 and are laid on an inner side of the lay-up. The lay-up is then bagged in a vacuum bag 80 which is then evacuated, and the lay-up is infused, and cured to obtain the aerodynamic shell body 21.

Figure 5D:
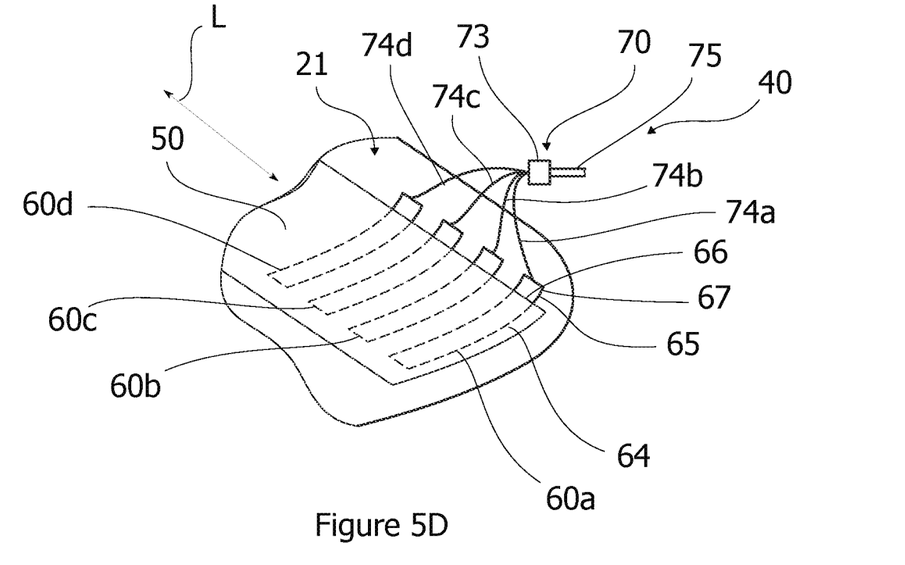
FIG. 5D shows a schematic perspective view of a de-icing system.

FIG. 5D illustrates an electrical connection between four metallic patches 60a, 60b, 60c, 60d and a conductor cable 70. The metallic patches 60a, 60b, 60c, 60d may each be arranged as described in relation to FIG. 5A or 5B. A border line 66 of each metallic patch 60 between its embedded portion 64 and exposed portion 65 is oriented substantially parallel to the longitudinal direction L of the aerodynamic shell body 21 and the wind turbine blade 10. The conductor cable 70 comprises a cable section 75 connected to a power source (not shown) of the wind turbine 2 or wind turbine blade 10. The cable section 75 terminates in a distributor 73 of the conductor cable 70 to which four individual conductor lines 74a, 74b, 74c, 74d are distributed, one to each of the metallic patches 60a, 60b, 60c, 60d so as to establish an electrical connection between the power source and the metallic patches 60a, 60b, 60c, 60d and further to the number of heating layers 50. The de-icing system 40 preferably comprises a number of resin buttresses providing a support between the exposed portion 65 of the number of metallic patches 60a, 60b, 60c, 60d and an inner side of the aerodynamic shell body 21.

Figure 6A:
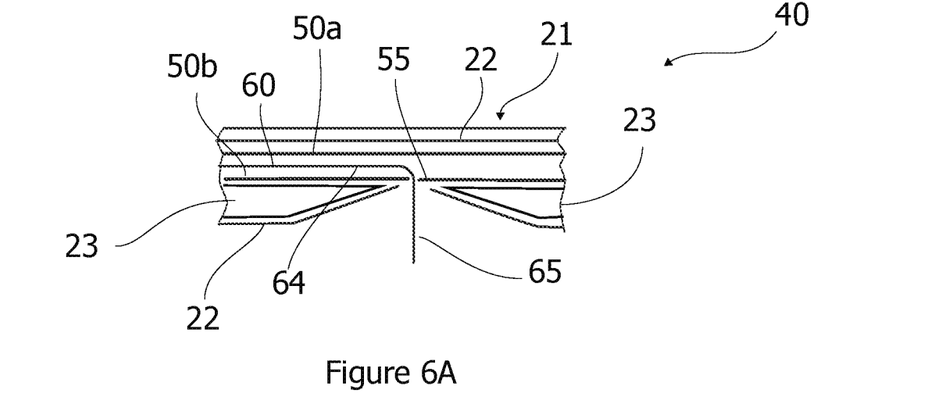
FIG. 6A shows a schematic cross-sectional view of a third layer arrangement of a de-icing system.
Figure 6B:
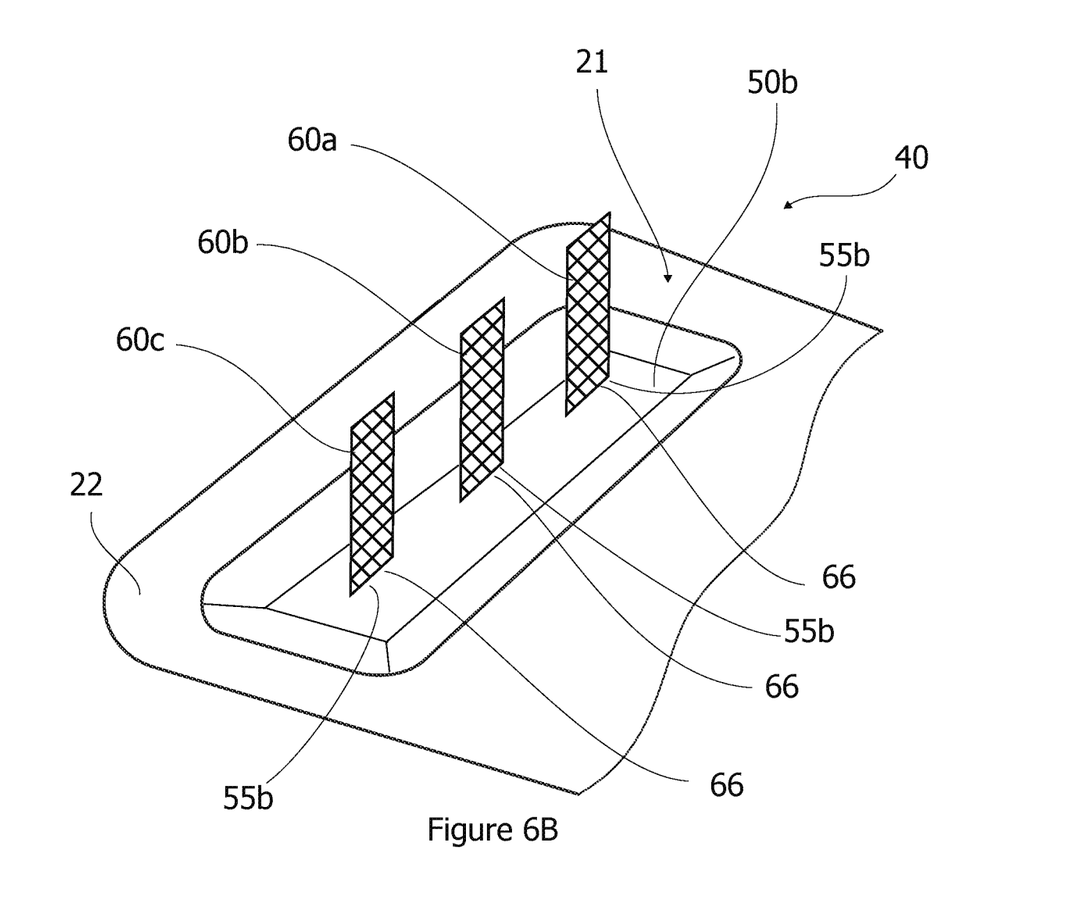
FIG. 6B shows a schematic perspective view of the third layer arrangement.

FIGS. 6A-6B illustrate a similar variant to that of FIG. 5A in which the metallic patch 60 extends through a slit of the second heating layer 50b. In FIG. 6, the aerodynamic blade body 21 comprises a core material 23, typically of balsa wood, which tapers adjacent to the slit 55 of the second heating layer to permit the exposed portion 65 of the metallic patch 60 to pass the core material to the inner side of the aerodynamic blade body 21. As illustrated in FIG. 6B, the number of metallic patches comprises a set of three metallic patches 60a, 60b, 60c arranged as in FIG. 6A and extends away from the second heating layer 50b and an inner side of the aerodynamic blade body 21. The free ends of the metallic patches 60a, 60b, 60c may then be connected to a power source in a similar way as described in FIG. 5D.

Figure 7:
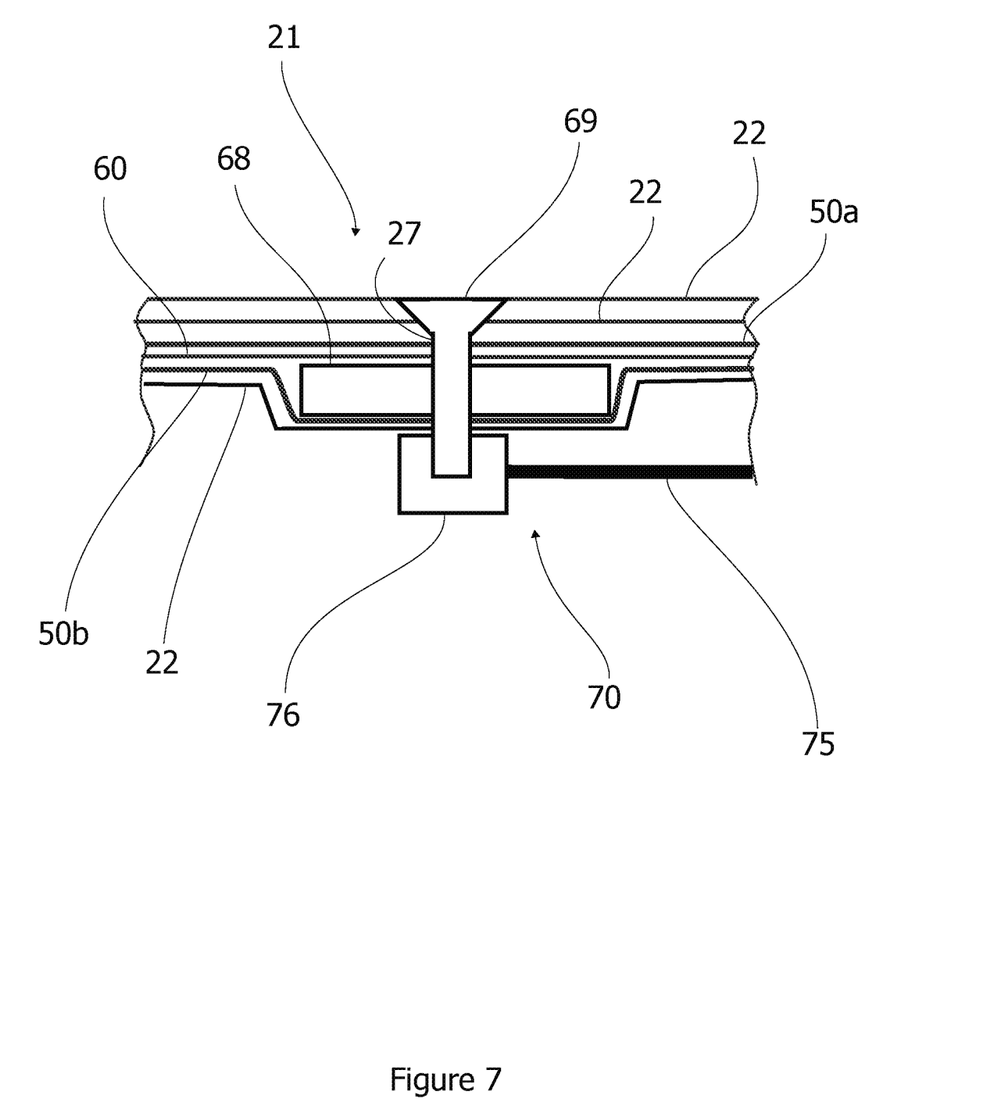
FIG. 7 shows a schematic cross-sectional view of a third connection between a conductor cable and a metallic patch in a de-icing system.

FIG. 7 illustrates a similar connection between the conductor cable 70 and a metallic patch 60 as FIGS. 3-4. The connection is advantageously located at the root end of the de-icing system. However, in FIG. 7, a first metallic connection element 68 has been embedded between the metallic patch 60 and the second heating layer 50b but could also have been embedded between the metallic patch 60 and the first heating layer 50a. The first metallic connection element 68 is in the form of a disc that may be made of bronze, e.g. of solid bronze. A termination block 76 of the conductor cable 70 is attached, e.g. adhesively, to an interior body layer 22 adjacent to the first metallic connection element 68. A cable section 75 of the conductor cable 70 extends from the termination block 76 towards the root of the wind turbine blade. After the shell body 21 has been manufactured and cured, the electrical connection between the termination block 76 and the metallic patch 60 can be formed exteriorly by drilling a hole 27 from the exterior of the shell body 21 that extends through the body layers 22, the first heating layer 50a, the metallic patch 60, the first metallic connection element 68, the second heating layer 50b, and into the termination block 76. The electrical connection is then formed by inserting a second metallic connection element 69 from the exterior into the hole 27. The second metallic connection element 69 includes a conductive paste to ensure a good electrical connection to the first metallic connection element 68 and the termination block 76. A head of the second metallic connection element 69 may be covered by an insulating material (not shown) to avoid attracting lightning.

LIST OF REFERENCE NUMERALS 2 wind turbine
4 tower
6 nacelle
8 hub
10 blade
13 shell
14 blade tip
15 tip end
16 blade root
17 root end
18 leading edge
20 trailing edge
21 aerodynamic shell body
22 body layer
22a opening
23 core material
24 pressure side shell part
26 suction side shell part
27 hole
30 root region
32 transition region
34 airfoil region
36 tip region
38 shoulder
40 de-icing system
41 root connection
42 tip connection
50 heating layer
50a first heating layer
50b second heating layer
55 slit
56 end
60 metallic patch
60a first metallic patch
60b second metallic patch
60c third metallic patch
64 embedded portion
65 exposed portion
66 border line
67 free end
68 first metallic connection element
69 second metallic connection element
70 conductor cable
71 conductive strand
72 first end
73 distributor
74 conductor line 75 cable section
76 cable termination block
80 vacuum bag

The invention claimed is:

1. A wind turbine blade comprising:
an aerodynamic shell body with a suction side shell part and a pressure side shell part that extends in a longitudinal direction between a root and a tip and in a transverse direction between a leading edge and a trailing edge, and
a de-icing system comprising:
a number of heating layers including a first heating layer, the number of heating layers each comprising electrically conductive fibres configured and arranged to extend in the longitudinal direction of the wind turbine blade along a longitudinal section of the aerodynamic shell body to provide resistive heating to the longitudinal section of the aerodynamic shell body;
a number of metallic patches including a first metallic patch, the number of metallic patches being arranged to contact at least the number of heating layers; and
a conductor cable that is electrically connected to the number of metallic patches and further is configured for electrically connecting to a power source,
wherein the electrically conductive fibres of the number of heating layers are configured for, upon receiving electrical power from the conductor cable via the number of metallic patches, supplying resistive heating to an outer side of the wind turbine blade so as to de-ice the wind turbine blade, and
wherein the number of heating layers includes a second heating layer, wherein the number of metallic patches is sandwiched between the respective first heating layer and the respective second heating layer.

2. The wind turbine blade according to claim 1, wherein the electrically conductive fibres of each of the heating layers comprise a biaxial carbon fibre layer.

3. The wind turbine blade according to claim 1, wherein the number of metallic patches comprise metallic meshes.

4. The wind turbine blade according to claim 1, wherein the number of metallic patches have a longitudinal extent of 100 mm to 2.0 m.

5. The wind turbine blade according to claim 1, wherein the number of metallic patches comprises a plurality of metallic patches that are distributed with a mutual longitudinal spacing along the number of heating layers, and wherein the mutual longitudinal spacing is 25 mm to 2.0 m or at least 2.0 m.

6. The wind turbine blade according to claim 1, wherein the number of heating layers is arranged along a leading edge section of the wind turbine blade.

7. The wind turbine blade according to claim 6, wherein the number of first heating layers each has a first side part extending along a part of the suction side shell part and a second side part extending along the pressure side shell part.

8. The wind turbine blade according to claim 1, wherein the conductor cable comprises a plurality of electrically conductive strands having first ends being spaced apart and distributed on the number of metallic patches to form the electrical connection between the conductor cable and the number of metallic patches.

9. The wind turbine blade according to claim 8, wherein the plurality of electrically conductive strands are spread in a fan arrangement.

10. The wind turbine blade according to claim 1, wherein at least the first metallic patch of the number of metallic patches has an embedded portion and an exposed portion, the embedded portion being fully embedded within the aerodynamic shell body, and the exposed portion extending from the aerodynamic shell body, wherein the conductor cable is attached to and in electrical communication with the exposed portion.

11. The wind turbine blade according to claim 10, wherein the number of metallic patches each comprises a border line between the embedded portion and the exposed portion, the border line being oriented parallel to the longitudinal direction of the aerodynamic shell body and the wind turbine blade.

12. The wind turbine blade according to claim 1, wherein the conductor cable is connected to the number of metallic patches via a flat electrical conductor.

13. The wind turbine blade according to claim 1, wherein the electrical connection between the conductor cable and the number of metallic patches is a tip connection arranged at a tip end of the de-icing system.

14. The wind turbine blade according to claim 1, wherein the wind turbine blade comprises a first metallic connection element embedded between the number of heating layers and the number of metallic patches and arranged in electrical contact with the number of metallic patches, wherein the conductor cable is attached to, and electrically connected with, the first metallic connection element so as to form an electrical connection between the conductor cable and the number of metallic patches.

15. The wind turbine blade according to claim 14, wherein the first metallic connection element is fully embedded between the number of heating layers and the number of metallic patches, and wherein the wind turbine blade comprises a second metallic connection element extending through the first metallic connection element and to the conductor cable so as to form the electrical connection between the conductor cable and the first metallic connection element.

16. The wind turbine blade according to claim 15, wherein the second metallic connection element is arranged in a hole extending through the first metallic connection element and through the heating layer and metallic patch sandwiching the first metallic connection element.

17. The wind turbine blade according to claim 14, wherein a flat electrical conductor is arranged on and in electrical contact with the number of metallic patches, and wherein the first metallic connection element is arranged on and in electrical contact with the flat electrical conductor.

18. A method of manufacturing a wind turbine blade according to claim 14, comprising the steps of drilling a first hole in the shell body from the exterior of the shell body through at least the first metallic connection element, inserting a second metallic connection element through the first hole to the conductor cable so as to form the electrical connection between the conductor cable and the number of metallic patches via the first metallic connection element.

19. A de-icing system for a wind turbine blade comprising an aerodynamic shell body with a suction side shell part and a pressure side shell part that extends in a longitudinal direction between a root and a tip and in a transverse direction between a leading edge and a trailing edge, the de-icing system comprising:
a number of heating layers including a first heating layer, the number of heating layers comprising electrically conductive fibres configured to extend in the longitudinal direction of the wind turbine blade along a longitudinal section of the aerodynamic shell body to provide resistive heating to the longitudinal section of the aerodynamic shell body;

a number of metallic patches including a first metallic patch, the number of metallic patches being arranged to contact at least the first heating layer; and a conductor cable that is electrically connected to the number of metallic patches and further is configured for electrically connecting to a power source, wherein the electrically conductive fibres of the number of heating layers are configured for, upon receiving electrical power from the conductor cable via the number of metallic patches, supplying heat to an outer side of the wind turbine blade so as to de-ice the wind turbine blade, wherein a first metallic connection element is embedded between the number of heating layers and the number of metallic patches and is arranged in electrical contact with the number of metallic patches, and wherein the conductor cable is attached to, and electrically connected with, the first metallic connection element so as to form an electrical connection between the conductor cable and the number of metallic patches.

20. A wind turbine blade, comprising:

an aerodynamic shell body with a suction side shell part and a pressure side shell part that extends in a longitudinal direction between a root and a tip and in a transverse direction between a leading edge and a trailing edge, and a de-icing system comprising:

a number of heating layers including a first heating layer, the number of heating layers each comprising electrically conductive fibres configured and arranged to extend in the longitudinal direction of the wind turbine blade along a longitudinal section of the aerodynamic shell body to provide resistive heating to the longitudinal section of the aerodynamic shell body;

a number of metallic patches including a first metallic patch, the number of metallic patches being arranged to contact at least the number of heating layers; and a conductor cable that is electrically connected to the number of metallic patches and further is configured for electrically connecting to a power source, wherein the electrically conductive fibres of the number of heating layers are configured for, upon receiving electrical power from the conductor cable via the number of metallic patches, supplying resistive heating to an outer side of the wind turbine blade so as to de-ice the wind turbine blade, and wherein at least the first metallic patch has an embedded portion and an exposed portion, the embedded portion being fully embedded within the aerodynamic shell body, and the exposed portion extending from the aerodynamic shell body, wherein the conductor cable is attached to and in electrical communication with the exposed portion.

* * * * *